May 17, 1949.  J. B. TREVOR, JR  2,470,118
VOLTAGE MULTIPLIER
Filed Dec. 14, 1943
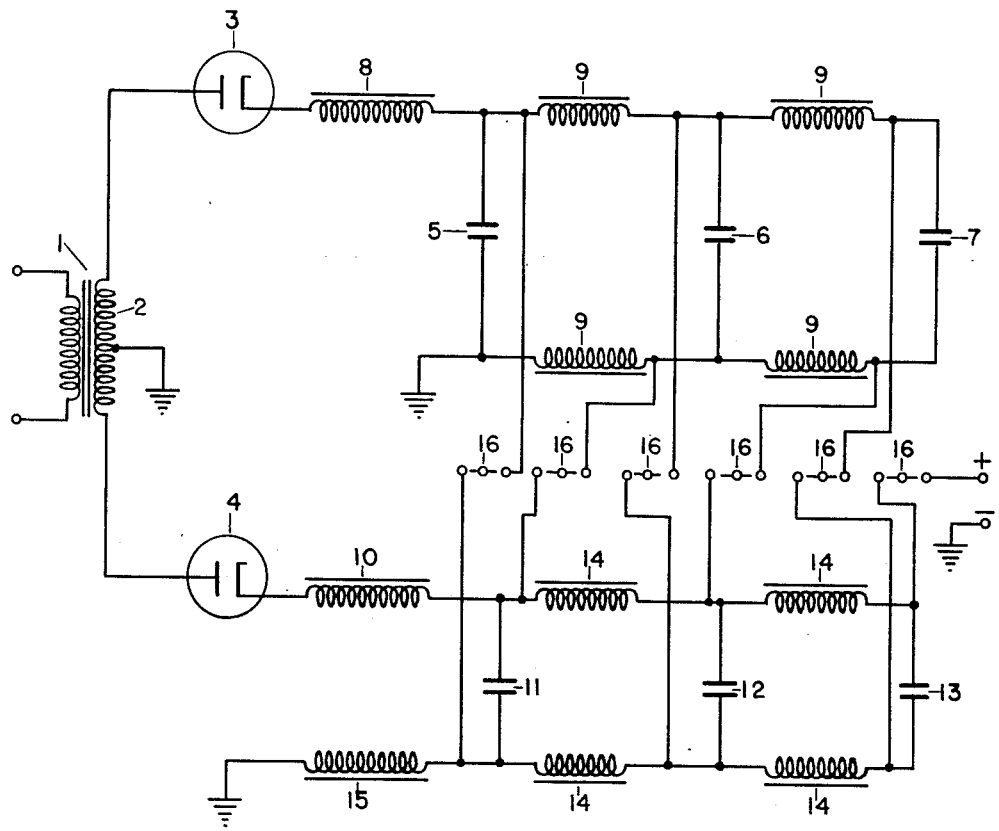
Inventor
JOHN B. TREVOR, JR.
By
*J J Fitzgerald*
Attorney Patented May 17, 1949

2,470,118

UNITED STATES PATENT OFFICE 2,470,118

VOLTAGE MULTIPLIER

John B. Trevor, Jr., Clinton, Md.

Application December 14, 1943, Serial No. 514,293

5 Claims. (Cl. 321—15)

(Granted under the act of March 3, 1883, as amended April 30, 1928; 370 O. G. 757)

This invention relates to voltage multipliers of the Marx type which are powered by rectifiers fed from alternating current systems, and is particularly directed to systems synchronously discharged on each cycle of the power supply.

Marx systems employ storage capacitors charged in parallel and discharged in series. Where such a network is charged by a half-wave rectifier, the charging current drawn by the rectifier is substantially concentrated in the first quarter cycle and gives very poor form factor. The same defect exists in a conventional system fed by a full wave rectifier, due to the fact that the Marx system draws its full charge in the first quarter cycle immediately following the discharge of the network. Whereas it has been proposed to limit the charging current to a Marx system and extend the charging period over a multiplicity of cycles, manifestly such expedient is not applicable where synchronous operation of the system is desired.

It is the object of the invention to provide a synchronously operated voltage multiplier system drawing current on both positive and negative half cycles of the power supply, having improved form factor and promoting efficiency of the system.

The invention will be further understood with reference to the exemplary embodiment shown in the drawing.

The system includes power supply transformer 1 provided with a center tapped secondary 2. Each of half of the secondary is loaded by a rectifier feeding a separate network of Marx storage components. The rectifiers are connected reversely in relation to the voltage developed across the secondary so that the separate systems are charged on successive half cycles. Consequently a symmetrical load is imposed on the alternating current supply.

The load circuits for the transformer secondary sections include rectifiers 3 and 4. The Marx system fed by rectifier 3 comprises storage capacitors 5, 6 and 7. The charging current is controlled by series choke 8 and the capacitors are charged in parallel and isolated on discharge by inductances 9. The negative side of condenser 5 is returned directly to ground.

Rectifier 4 feeds another system through charging choke 10, the system including storage capacitors 11, 12 and 13, and isolating inductances 14. The system is distinguished from that fed by rectifier 3 in being isolated from ground on discharge, inductance 15 being connected to condenser 11.

The storage capacitors of both networks are therefore dynamically isolated from one another.

Discharge is effected at the power frequency by synchronously driven gaps 16 operative to connect the storage capacitors in series. Consequently during the charging period one of the storage networks is charged on each half cycle, and a symmetrical current wave of improved form factor is obtained.

The invention described herein may be manufactured and used by or for the Government of the United States of America for governmental purposes without the payment of any royalties thereon or therefor.

I claim:

1. A voltage multiplier including a pair of rectifiers operatively connected to an alternating supply for alternate conduction in successive half cycles, a Marx storage capacity network fed by each rectifier, the capacitors of both networks being dynamically isolated from one another and means for discharging the capacitors in series periodically after charging of the networks on successive half cycles.

2. A voltage multiplier including a pair of rectifiers operatively connected to an alternating supply for alternate conduction in successive half cycles, a Marx storage capacity network fed by each rectifier, means for dynamically isolating the Marx networks, and means for discharging the storage capacitors of both networks in series periodically after charging of the networks on successive half cycles.

3. A voltage multiplier comprising a pair of Marx storage capacity networks, one of said networks having a capacity connected directly to ground, and the other having a capacity connected to ground through an isolating impedance, means for charging said networks comprising an alternating voltage supply, rectifier means for charging the networks therefrom on successive half cycles, and means for periodically discharging the storage capacitors of both networks in series after charging of the networks on successive half cycles.

4. A voltage multiplier comprising a pair of storage networks each including a plurality of capacitors, a pair of rectifiers operatively connected to an alternating supply for alternate conduction in successive half cycles, means connecting one of said rectifiers to one of said networks to charge the capacitors thereof in parallel relation during one half cycle of a cycle of said alternating supply, means connecting the other of said rectifiers to the other of said networks to charge the capacitors thereof in parallel relation during the other half cycle of said cycle, means dynamically isolating said networks and means discharging the capacitors of said pair of networks in series relation in synchronism with said alternating supply.

5. A voltage multiplier comprising a pair of storage networks each including a plurality of capacitors, a pair of rectifiers operatively connected to an alternating supply for alternate conduction in successive half cycles, means connecting one of said rectifiers to one of said networks to charge the capacitors thereof in parallel relation during one half cycle of each cycle of said alternating supply, means connecting the other of said rectifiers to the other of said networks to charge the capacitors thereof in parallel relation during the other half cycle of each cycle of said alternating supply, means dynamically isolating the capacitors of said one network from the capacitors of said other network and means discharging the capacitors of said pair of networks in series relation in synchronism with said alternating supply.

JOHN B. TREVOR, Jr.

REFERENCES CITED

The following references are of record in the file of this patent:

UNITED STATES PATENTS

| Number | Name | Date |
| --- | --- | --- |
| 1,997,064 | Lusignan | Apr. 9, 1935 |
| 2,064,630 | Rorden | Dec. 15, 1936 |